Nov. 25, 1924.
L. H. FALLEY
1,516,767
CURRENT DEFLECTOR
Filed May 19, 1922
4 Sheets-Sheet 1
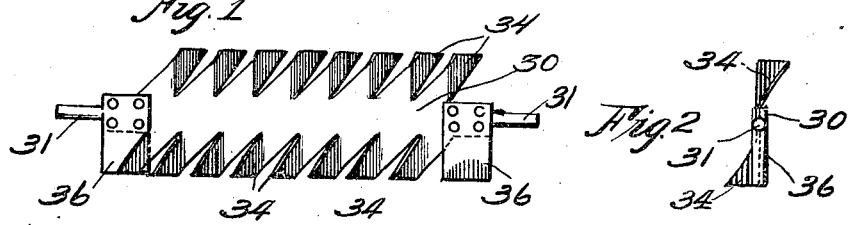
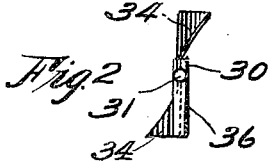
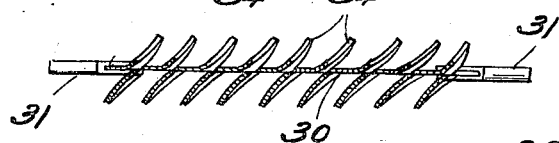
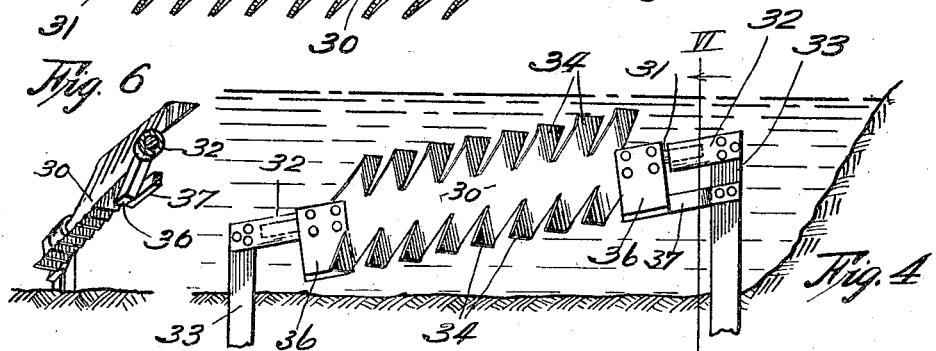
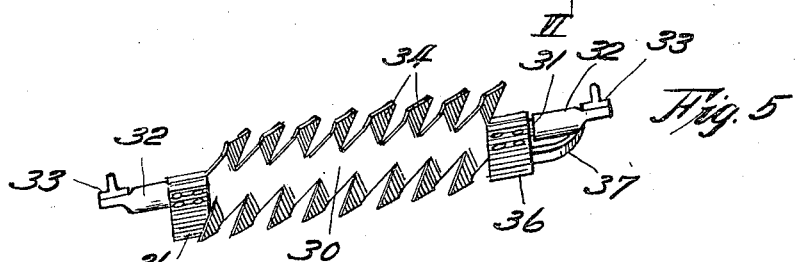
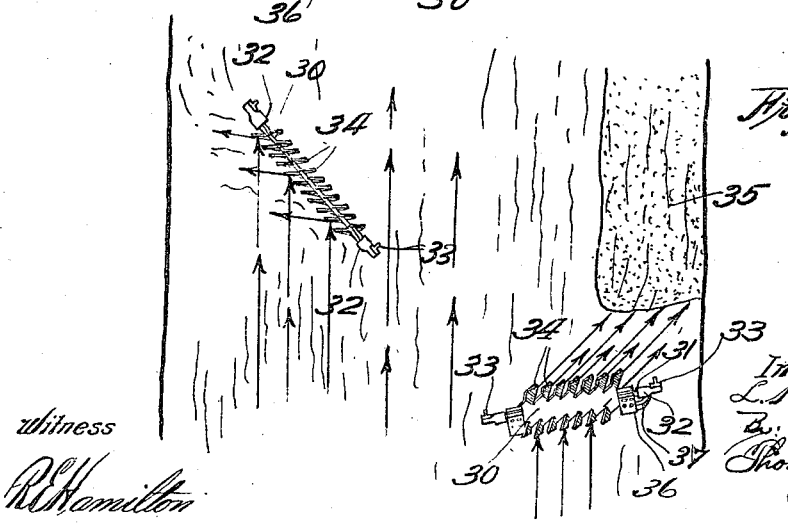

Nov. 25, 1924.                     L. H. FALLEY                     1,516,767
                                  CURRENT DEFLECTOR
                                 Filed May 19, 1922                4 Sheets-Sheet 2
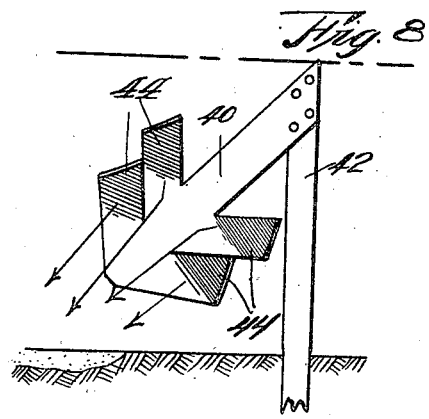
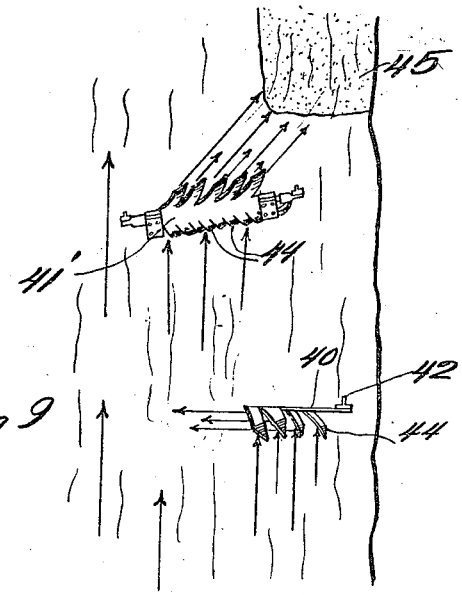
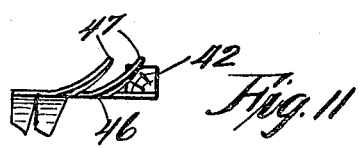
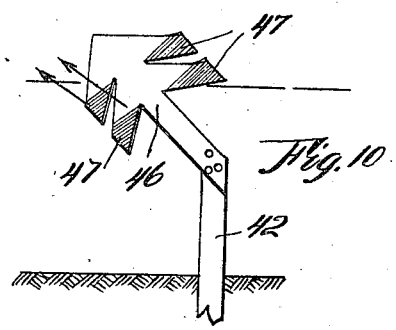
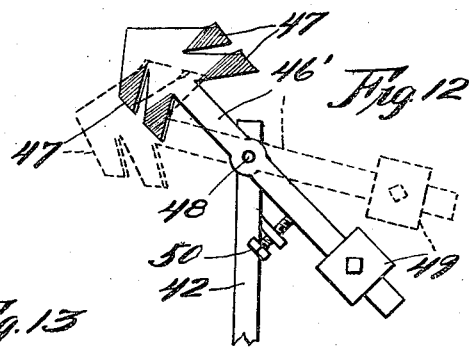
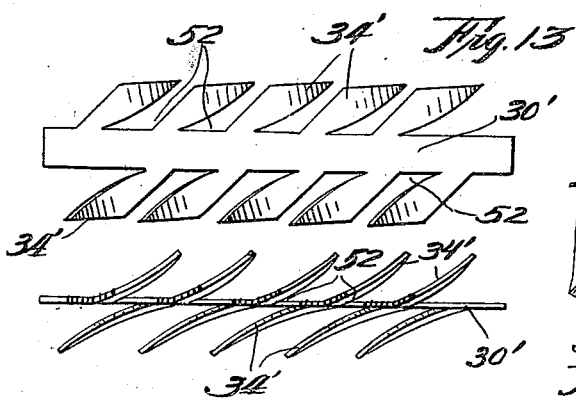
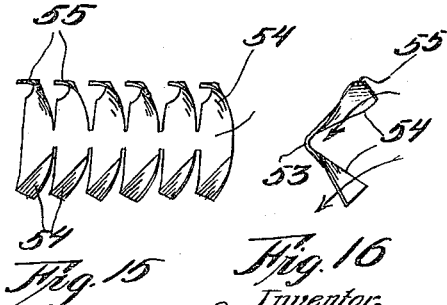

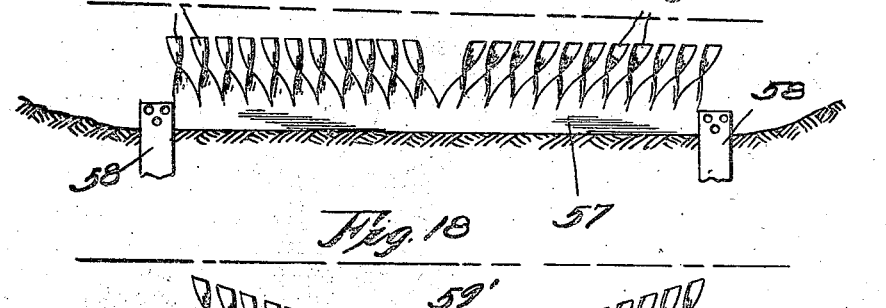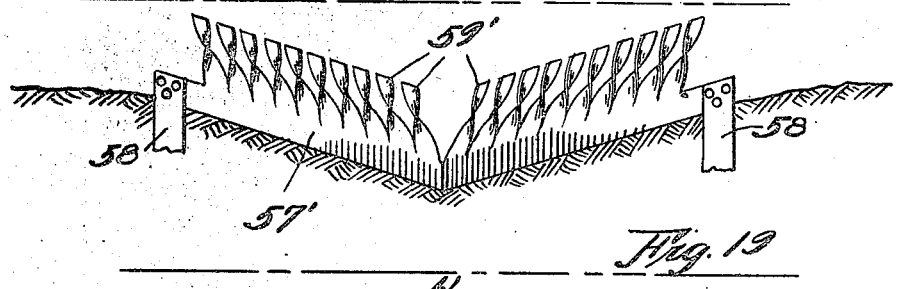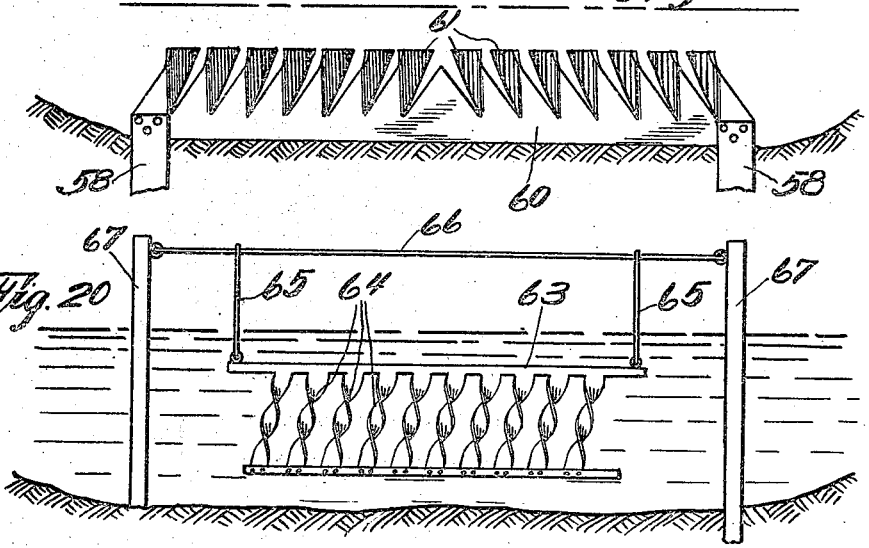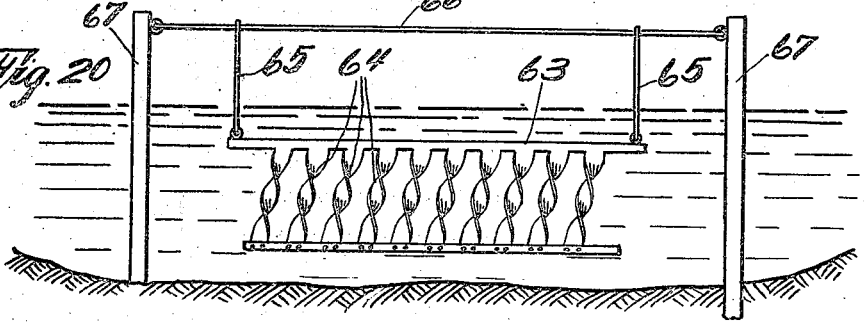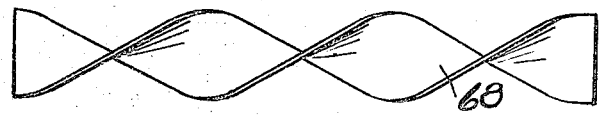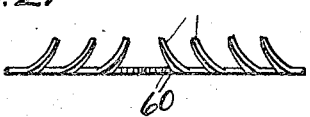

Nov. 25, 1924.
L. H. FALLEY
1,516,767
CURRENT DEFLECTOR
Filed May 19, 1922   4 Sheets-Sheet 4
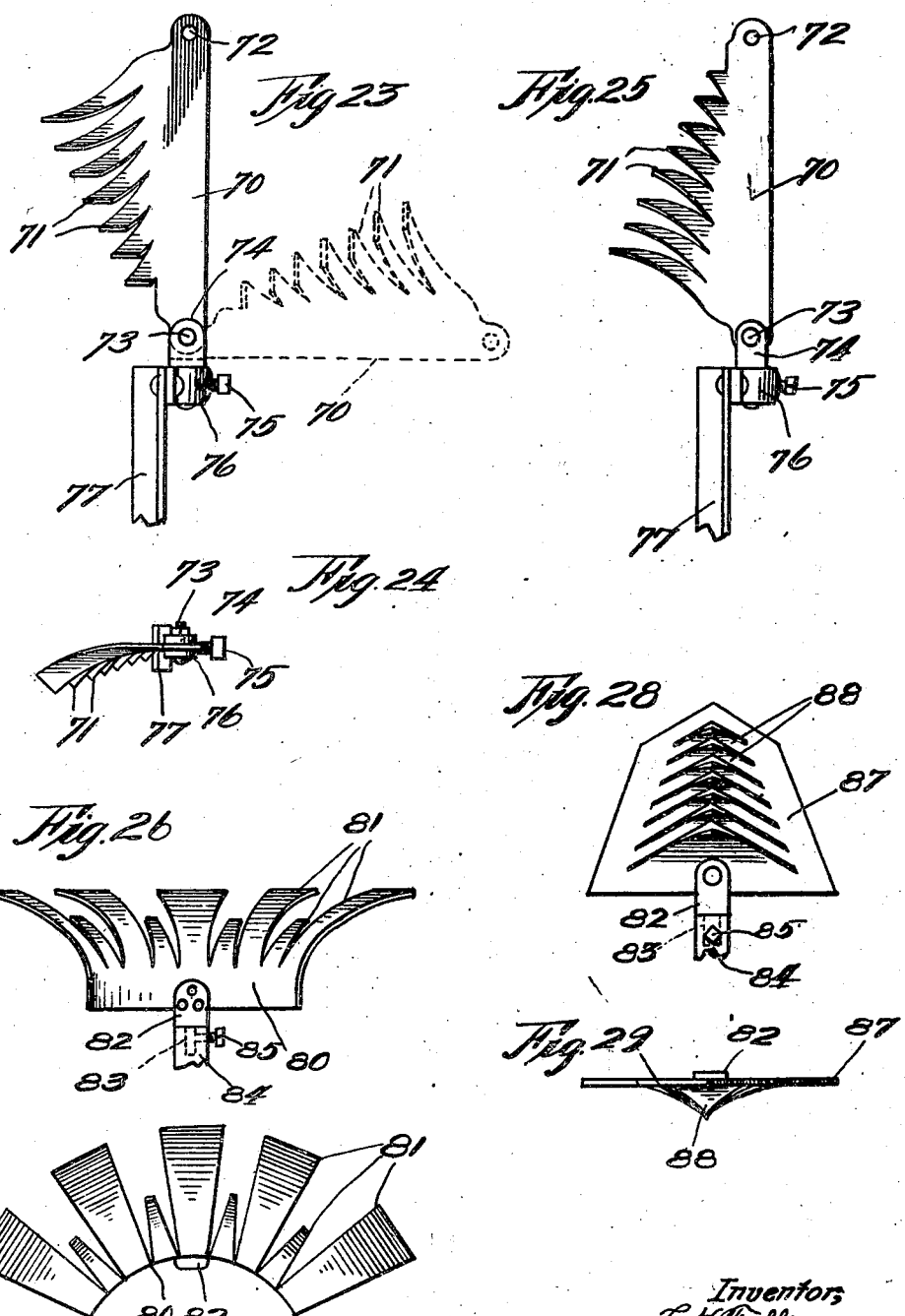

Patented Nov. 25, 1924.

1,516,767

UNITED STATES PATENT OFFICE.

LEWIS H. FALLEY, OF KANSAS CITY, MISSOURI, ASSIGNOR TO M. H. FALLEY, OF KANSAS CITY, MISSOURI.

CURRENT DEFLECTOR.

Application filed May 19, 1922. Serial No. 562,142.

*To all whom it may concern:*

Be it known that I, LEWIS H. FALLEY, a citizen of the United States, and resident of Kansas City, county of Jackson, State of Missouri, have invented a certain new and useful Improvement in Current Deflectors, of which the following is a complete specification.

The present invention relates to apparatus for use in waterways, streams or the like, for the purpose of modifying the current movements and thereby controlling the action of the current as regards its properties both for collecting material in suspension and for precipitating the same.

Accordingly, I have devised a novel and efficient baffle or current-interrupting and deflecting structure adapted to be submerged in the stream or current and so constructed as to intercept the current flow and deflect the same in a manner dependent upon the particular shape or contour of the baffle elements and the particular angular position given the structure.

Preferably, the baffle construction which I employ comprises a member carrying a plurality of baffle or deflecting teeth or fingers of curved or twisted outline for imparting the modifying influence upon the current, and the construction is such as to be susceptible of great variation as to the particular style, shape and arrangement of the baffle elements and position of use, in accordance with the specific effects adapted to be produced as regards the modification of the main current.

With these general objects in view, the invention will now be described by reference to the accompanying drawings illustrating various practical forms of embodiment of the improvements, after which those features deemed to be novel will be particularly set forth and claimed.

In the drawings—

Figures 1, 2 and 3 are side, end and edge views, respectively, of one form of baffle structure embodying the present invention;

Figure 4 is a side elevation illustrating said structure supported in operative position in a stream;

Figure 5 is a plan view of the structure and supporting means shown in Figure 4;

Figure 6 is a section taken on the line VI—VI of Figure 4;

Figure 7 is a plan view illustrating different operative positions of said baffle structure;

Figure 8 is a side view illustrating a modified form of the baffle structure;

Figure 9 is a plan view illustrating two different operative positions of the same;

Figures 10 and 11 are side and edge views, respectively, of another form of the baffle structure;

Figure 12 is a side view of a modified form of mounting for the baffle structure shown in Figures 10 and 11, with dotted lines representing the baffle member shifted into a different position upon its pivot;

Figures 13 and 14 are side and edge views, respectively, of another modified form of the baffle structure;

Figures 15 and 16 are side and end views, respectively, of still another form of the construction;

Figures 17 to 20 are elevations illustrating still other modified forms of construction, each mounted in operative position;

Figure 21 is a detail plan view of a portion of the baffle structure shown in Figure 19;

Figure 22 is a plan view of a baffle member of the same type of construction as the baffle elements shown in Figure 20;

Figures 23 and 24 are side and top plan views, respectively, illustrating another pivotally adjustable form of baffle member, with dotted lines in Figure 2 representing the baffle member in a different position of adjustment;

Figure 25 is a view similar to Figure 23 but showing the baffle member inverted;

Figures 26 and 27 are side and top plan views, respectively, showing another form of baffle construction; and Figures 28 and 29 are similar views illustrating a still further form of construction.

Certain forms of baffle constructions have heretofore been used for deflecting the current movements of waterways, streams and the like, but without any provision for exerting any controlling effect upon the current's action as regards its collection of material or the precipitation of the same. Where a baffle construction is used which has no provision for imparting or setting up any minor centrifugal or swirling currents at the same time that the main current is deflected, such a construction will not accomplish any particularly effective results as regards the displacing, moving and transferring, and the deposit of sand, silt or other material with which the water of the current becomes charged. In each of the forms of the baffle construction comprising the present invention, which will hereinafter be described, specific provision is made for not only baffling and deflecting, while in some cases retarding and in other instances somewhat accelerating, the movement of the current, but also to establish or set up what may be termed centrifugal minor currents, usually in great number, according to the number of the baffle elements carried by each of the baffle members; and in each case, the direction of the deflection, and hence the character and energy of the resultant minor current, is determined by the outline or shape of the individual baffle element, its pitch, and the angle at which it is disposed with relation to the path or direction of flow of the main current in which the baffle structure is submerged.

Referring now to Figures 1 to 6, inclusive, these views illustrate one of the forms of the construction as comprising a baffle member 30, the opposite ends of which are provided with spindles 31 whereby said member may be mounted for tilting movement in bearings 32 which may be supported in any suitable manner, as by upright posts 33, for presenting the baffle member in its operative relation to the current of a stream as illustrated in Figure 4. Preferably, the baffle member 30 is formed with two longitudinal sets or rows of baffle teeth or fingers 34 projecting in substantially opposite directions from the upper and lower sides, respectively, of the member 30. These baffle elements or fingers 34 are of curved and somewhat twisted contour (see Figures 1 to 3) for the purpose of not only breaking up and deflecting the current but also imparting a vigorous twist or swirl to each minor current thus produced by the individual baffle elements, from which it will be understood that the main current on striking the baffle member is at first retarded, then broken up and deflected into a plurality of minor centrifugal or swirling currents following a direction as determined by the direction of curvature of said deflecting fingers 34. The baffle member is preferably supported at more or less of an angle to the horizontal, as represented in Figures 5 and 6, and since the lower baffle fingers are bent oppositely to the upper fingers 34, they will have the same deflecting action and hence produce the same modifying effect as the upper baffle fingers.

Referring to Figure 7, the baffle member 30 shown at the right in said view is in position for intercepting the main current, and breaking the same up and deflecting the resultant minor currents to the right in such a manner as would be required for the building up of a bar as indicated at 35 by the deposit of the material suspended in the water, it being evident that such material is at once precipitated on the slowing down or retarding of the minor centrifugal swirls set up by the action of the baffle fingers. When the upper sets or rows of baffle fingers 34 are arranged in forwardly extending position and turned to the right as shown in Figure 7, the deflection of the minor currents will be to the right as indicated by the arrows at the right in Figure 7, whereas by simply inverting the baffle member 30 it is apparent that the upper set or row of baffle fingers will be turned toward the left, with the result that the deflection of said minor current would likewise be to the left. On the other hand, if the baffle member be reversed end for end, with the upper baffle fingers projecting rearwardly and to the left, the result will be a deflection of the minor current produced by said fingers downwardly and to the right, while inverting the baffle member in this position, so that the upper baffle fingers will point rearwardly and to the right, the result will be a deflection of the minor currents produced by the baffle in a downward direction to the left; these downwardly moving secondary currents will be obviously of a character to exert a digging or excavating action useful for removing soil or sandy material from the bottom of a stream for shaving down an embankment or bar and directing the material thereof to another point. In actual operation, the use of the baffle construction for carrying out the excavating function may be by means of simply one of the baffle members or by the use of a combination of two or more of them for not only excavating but controlling the movement of the material to be transferred, according to the particular requirements to be dealt with. In each case, furthermore, the angle at which the baffle member is disposed to the horizontal may vary, as well as the angle at which said member is presented transversely with reference to the current it intercepts, this angle being made more extreme in some instances as illustrated to the left in Figure 7 where the deflected secondary currents are being directed to the left at a rather sharp angle approaching a right angle.

Another function of the operation illustrated in Figure 7 is the protection afforded by the baffle structure to that area or zone from which the water of the stream is being deflected by the action of the baffle structure, which is extremely useful in those cases where it is desirable to prevent the wearing away or erosive action of the water current, as, for example, to prevent the cutting away of banks or bars, or to shield such structures as piers, docks, bridge abutments and the like from the damaging effects often resulting from the prolonged action of water currents.

When the baffle member 30 is pivotally mounted as illustrated in Figure 4, its pivotal movement is limited by means of a plate 36 secured to either end of the member, and adapted for engagement with a stop finger 37 projecting from the adjacent upright 33, thereby limiting the backward pivotal movement of the member 30 while allowing it to rotate forwardly in case a log or other floating object being carried by the current and engaging the upper portion of the baffle member, the latter being permitted to tip in the direction of the current for releasing such floating object without incurring any damage to the baffle structure.

In Figure 8, I illustrate the baffle construction as taking the form of a baffle member 40 supported in downwardly inclined position from the upper end of a post or upright 42 and provided with curved and somewhat twisting deflecting fingers 44 arranged in two parallel sets or rows both projecting backwardly or in opposition to the direction of the current of the stream, as indicated in Figure 9. This form of baffle member is adapted to be supported by means of an upright post 42 mounted in the bed of the stream, with said member 40 arranged at more or less of an angle (see Figure 8), whereupon the minor or secondary currents created by the action of the baffle elements will be directed downwardly at an angle toward the bed of the stream, as represented by the arrows in Figures 8 and 9, thus operating with a digging or excavating action tending to loosen up the material at the bottom of the stream so that the material thus excavated can be caught up and carried away with the water current. This form of baffle member can, of course, be set at any angle required, as, for example, for the purpose of exerting its action upon a bar or embankment which is to be cut away and the material thereof transferred to another point. Hence the structure may be variously arranged, and in Figure 9 is shown the baffle member of Figure 8 in plan view, and also a baffle member 41' of the same type but with a greater number of baffle elements 44 and arranged in advance of the member 40 in position for carrying out the digging or excavating operation still further and also deflecting the secondary currents to that point where it is sought to have the material deposited, as indicated at 45. Thus the baffle member 41', with the deflecting fingers arranged as shown, combines the simple current intercepting and deflecting function of the structure shown in Figures 1 to 7, with an excavating or digging function, the effect of which may likewise be varied in accordance with the angle at which the said member 41' is located with reference to the main current of the stream.

In Figures 10 and 11, I illustrate a type of baffle member 46 formed with baffle fingers 47 of curved and somewhat twisted outline and projecting in opposite oblique directions from the opposite sides of said member 46, and the two sets of fingers 47 being bent in opposite directions. The member 46 is adapted to be supported in inclined position (opposite from that shown for the baffle member 40 in Figure 8) by means of an upright member 42 and with one of the sets of fingers 47 submerged and the other set of said fingers projecting above the water level, as clearly illustrated in Figure 10. With this construction, it is apparent that the baffle member 46 may be so disposed with relation to the main current that both sets of baffle elements 47 will exert a combined lifting and deflecting action, and therefore in the event of a rise in the stream or waterway due to freshets or other natural causes the upper baffle elements, as they become submerged, will continue the deflecting action of the lower baffle elements with a view to controlling or deflecting the rising current into any desired direction and causing the sand or other material carried by the current to be deposited at the desired location. In Figure 12 is illustrated a modified form of supporting means for the same type of baffle structure, the baffle member 46' being pivoted, as indicated at 48, upon the upright 42, and carrying a suitable counterweight 49 for maintaining that end of the member 46' carrying the baffle structure at the required elevation. This elevation may be conveniently regulated by means of a stop or limiting screw 50, as shown. As illustrated by the dotted lines in said view, the pivotal mounting of the baffle member 46' allows it to be deflected by the action of any floating object near the surface of the stream, so that such objects may pass without material hindrance and likewise without doing any injury to the baffle structure, the counterweight 49 immediately returning the baffle structure to normal position as determined by the adjustment of the screw 50.

In Figures 13 and 14 is illustrated a baffle member 30' formed with two sets or rows of baffle elements or fingers 34', the construction being similar, in general, to that form of baffle member illustrated in Figures 1 to 3, with the difference that clearance spaces 52 are provided between the baffle fingers 34' for the purpose of reducing the retarding action of the baffle member upon the current, which is desirable under certain conditions, particularly in some of the more pronounced angular positions of the baffle structure.

In Figures 15 and 16 is illustrated another form of the baffle structure especially adapted for the digging or excavating function, the same comprising a baffle member 53 provided with two rows or sets of baffle elements or fingers 54 extending at substantially right angles to each other, and with the extremities of the upper elements or fingers 54 bent at a sharp angle, as indicated at 55. With the contour and arrangement of baffle elements illustrated in Figures 15 and 16, and with said elements projecting oppositely to the direction of the current flow, it is apparent that the latter will be deflected downwardly in the direction of the arrows in Figure 16, in such a way as to exert a more vigorous and effective excavating effect than characterizes the forms of construction shown in the preceding views.

In Figures 17, 18, 19 and 21 are illustrated forms of baffle structures adapted to be located in operative relation to the bottom of a stream for the purpose of upwardly deflecting the current and thereby preventing the deposit of material in the immediate vicinity of the baffle structure. In Figure 17 is illustrated a baffle member 57 adapted to be anchored, as by means of posts 58 or the like, to the bed of the stream, said member 57 being formed with two sets or rows of upwardly projecting baffle fingers or elements 59 of curved and twisted outline, the two sets of fingers inclining outwardly in opposite directions for correspondingly deflecting the secondary current and thereby causing the material, when finally precipitated, to be deposited in the vicinity of the sides or banks of the stream. Figure 18 illustrates a similar construction comprising a baffle member 57' with two sets of baffle fingers 59', said member 57', however, being of V-shape and converging forwardly in the direction of the current as well as downwardly within the bed of the stream; this structure is further adapted for more sluggish currents, the angular and inclined arrangement of the baffle structure exerting a more effective lifting and deflecting action upon such currents, with the same general effect as already described in connection with Figure 17. In Figures 19 and 21 is illustrated a baffle member 60, likewise adapted to be anchored to the bed of the stream, and formed with deflecting fingers or elements 61 of curved outline and in two sets slanting obliquely toward each other in such a manner as to deflect the minor or secondary currents toward each other into substantially a central path corresponding to the middle line of the stream. The action of such a baffle structure serves to exert an equalizing effect upon the current flow, breaking up any eddies therein, and causing any material that is precipitated to be deposited along said central line after the secondary deflected currents have left the immediate vicinity of the baffle structure.

In Figure 20 is also illustrated a modified form of baffle structure designed for the same function of overcoming objectional eddies in the main current flow, as well as a modified form of support for the baffle structure. In this case the baffle means comprises a baffle member 63 supporting a plurality of inclined and parallel baffle elements 64 of helical outline, the member 63 being suspended by means of hangers 65 carried by a horizontal rod 66 suspended between a pair of upright members 67. Such an arrangement of baffle means acts to effectively comb out the main current of the stream, deflecting the minor currents produced thereby in either an upward or downward direction, depending upon the angle at which the baffle structure is presented to the current. In Figure 22 is illustrated a baffle unit 68 of helical form, such as comprises one of the units 64 of the baffle member 63, said unit 68 being adapted to be constructed in any size and used either singly or in a combination of any desired number of said units, for obtaining practically any desired breaking up or deflection of the current flow of a stream, depending upon the operative position in which said unit or units 68 are disposed with relation to the current.

In general it may be stated with reference to the types of construction illustrated in Figures 17 and 22, inclusive, that these forms of construction may be used to particular advantage in preventing the formation of objectionable bars or ridges by the settling of sand or other material carried by the stream, accomplishing this function by the control of the current's movement through the breaking up and deflection thereof as above described; such a result is of advantage at such points as the confluence of two streams, where the formation of bars may be effectively prevented by the operation of one or more of the described baffle structures and thus establishing and maintaining an open, navigable channel or waterway of a permanent character.

In Figures 23 and 25 I illustrate a simplified form of baffle member 70 formed with a single set or row of baffle fingers 71 of curved and slightly twisted outline and gradually increasing in length from one end of the row to the other. The opposite ends of the member 70 are provided with bolt openings 72 whereby said member may be reversibly mounted upon a bolt 73 carried by a rotatable block 74 which is adapted to be clamped by means of a set screw 75 in a bearing bracket 76 carried by a supporting member or upright 77. In this way, the baffle member 70 is supported for universal adjustment, permitting said member to be positioned at any desired angle to the current, including the angular adjustment of said member in its reversed position shown in Figure 25, the dotted lines in Figure 23 illustrating the baffle member presented in horizontal position. It is obvious that, by means of this type of baffle structure, practically any desired deflection of the minor currents produced by the baffle fingers may be obtained; of course, any number of units 70 may be employed, and the same used in conjunction with any of the other forms of construction already described as particular conditions may require.

In Figures 26 and 27 I illustrate a form of baffle member 80 of curved outline and provided with outwardly curved baffle or deflecting fingers 81, to be presented in the direction of the current, said member 80 being carried by a supporting bracket 82 having a spindle 83 adapted to be received in a socket at the upper end of a supporting member or upright 84 and clamped thereto by means of a set screw 85; this method of mounting obviously permits any desired adjustment of the position of the baffle member with reference to the axis of the spindle 83. The function of this type of baffle structure is to modify the current flow by not only slightly retarding the same, but lifting the current and flattening it out, and can be employed for the purpose of building up a bar by the settling of the material carried by the current.

The construction shown in Figures 28 and 29 comprises a baffle member 87 in the form of a plate provided with interior V-shaped baffle elements 88 converging to the center line of the plate 87 and curved in the same direction out of the plane of the plate, as shown in Figure 29. The plate 87 is adapted to be mounted in the same manner as shown and described for the baffle member 80 (see Figure 26), in order to permit of the adjustment of the plate 87 about a vertical axis. This construction also operates as a current retarding and elevating baffle structure, but tends to converge the baffled current, so that any material precipitated thereby will be eventually deposited along a limited path; or, the device may, by suitable positioning of the same, be used for shaving down a bar by directing the currents thereon at the proper angle.

The function of the various types or modifications of baffle construction illustrated in the drawings has been indicated in the description pertaining to each of the forms, the principle of the operation being substantially the same in all of them, namely, the interception of the current flow, the deflection thereof, and simultaneous production of a multiplicity of minor or secondary currents; the character and direction of these currents depend upon the specific type of the baffle structure used, and the particular position it occupies with reference to the current of the stream. The invention does not, therefore, operate simply as a dam or jetty, which depend upon the obstruction or deflection en masse of the entire body of water intercepted, without such modification thereof (by the breaking up and formation of secondary deflected currents) as effected by the improved baffle structure. Moreover, the improved structure is practically non-fouling, and self-cleaning, by the action of the water, and functions automatically, in that in the event of high-water destroying or removing the whole or a part of an adjacent bar designed to be maintained by the operation of the baffle structure, the latter will at once resume its function of rebuilding the bar to its normal size. Obviously, the various forms of baffle structures may be used in a series of containing any number of units of either the same type of unit or different units in combination, according to the work to be done, for cutting away or building up a bar (the arrangement of baffles being such as to carry the material toward or away from a certain location), or for protecting a certain location from the deposit of material, and so forth, as indicated in the foregoing description.

It is also apparent that modifications may be made in the specific details of construction set forth within the scope of the invention, and I desire to reserve the right to make all such changes as may fairly and properly fall within the scope of the appended claims.

What I claim is:

1. Current interrupting and deflecting means comprising a normally stationary device adapted to be submerged in the path of a steadily moving current and provided with a plurality of baffle blades of curved and twisted outline projecting in the path of the current and operative to retard, break up and deflect the current at an angle to its normal path.

2. Current interrupting and deflecting means comprising a normally stationary device adapted to be submerged in the path of a steadily moving current and provided with a plurality of baffle blades of curved and twisted contour and arranged in a row and presented at an angle to the current and operative to comb the current and thereby break up and deflect the same at an angle to its normal path.

3. Current interrupting and deflecting means comprising a normally stationary device adapted to be submerged in the path of a steadily moving current and in a position extending at an angle to the horizontal, one margin of said device being formed with a plurality of baffle fingers of curved and twisted contour presented obliquely to the path of the current and operative to break up and deflect the same at an angle to the normal path thereof.

4. Current interrupting and deflecting means comprising a normally stationary device adapted to be submerged in the path of a steadily moving current and provided with a plurality of parallel rows of baffle blades of curved and twisted outline projecting in the path of the current and operative to break up and deflect the same at an angle to its normal path.

In witness whereof I hereunto affix my signature.

LEWIS H. FALLEY.